US006994364B2

(12) United States Patent  
Nelson et al.

(10) Patent No.: US 6,994,364 B2
(45) Date of Patent: Feb. 7, 2006

(54) WHEELCHAIRS

(75) Inventors: Sean Patrick Nelson, Wrexham (GB); Thomas Paul Suddaby, Newent (GB)

(73) Assignee: Specmat Limited, Herefordshire (GB)

( * ) Notice: Subject to any disclaimer, the term of this patent is extended or adjusted under 35 U.S.C. 154(b) by 0 days.

(21) Appl. No.: 10/402,040

(22) Filed: Mar. 27, 2003

(65) Prior Publication Data

US 2003/0197345 A1 Oct. 23, 2003

(30) Foreign Application Priority Data

Mar. 27, 2002 (GB) .................................. 0207144

(51) Int. Cl.
*B62M 1/14* (2006.01)
(52) U.S. Cl. .............................. 280/250.1; 280/304.1; 280/755
(58) Field of Classification Search ............ 280/250.1, 280/47.34, 47.38, 47.4, 304.1, 767, 755; 180/907

See application file for complete search history.

(56) References Cited

U.S. PATENT DOCUMENTS

| | | | |
|---|---|---|---|
| 2,711,916 A | | 6/1955 | D'Azzo |
| 4,007,993 A | | 2/1977 | Schwartz |
| 4,231,589 A | | 11/1980 | Hodgkins et al. |
| 4,749,064 A | | 6/1988 | Jinno et al. |
| 4,893,827 A | | 1/1990 | Gay et al. |
| 5,176,393 A | * | 1/1993 | Robertson et al. ........ 280/250.1 |
| 5,284,350 A | | 2/1994 | Geiger et al. |
| 5,301,964 A | * | 4/1994 | Papac ....................... 280/250.1 |
| 5,496,050 A | * | 3/1996 | Geiger et al. ............. 280/250.1 |
| 5,762,356 A | * | 6/1998 | Kunze et al. ............. 280/304.1 |
| 6,047,979 A | | 4/2000 | Kraft et al. |
| 6,206,393 B1 | | 3/2001 | Mascari et al. |
| 6,217,114 B1 | * | 4/2001 | Degonda .................... 297/325 |
| 6,227,559 B1 | * | 5/2001 | Slagerman et al. ......... 280/650 |
| 6,375,209 B1 | * | 4/2002 | Schlangen ................ 280/250.1 |
| 6,428,029 B1 | * | 8/2002 | Barclay ................... 280/250.1 |
| 2003/0107197 A1 | * | 6/2003 | Chao ......................... 280/80.1 |
| 2003/0230868 A1 | * | 12/2003 | Beumer .................... 280/250.1 |

FOREIGN PATENT DOCUMENTS

| | | |
|---|---|---|
| DE | 29705494 | 3/1997 |
| DE | 10013564 C1 | 3/2000 |
| EP | 0737464 A2 | 10/1996 |
| EP | 1059075 | 12/2000 |
| EP | 1180607 | 2/2002 |
| GB | 801958 | 9/1958 |
| GB | 2040237 | 8/1980 |
| GB | 2364739 | 2/2002 |
| WO | WO88/03399 | 5/1988 |

\* cited by examiner

*Primary Examiner*—Anne Marie Boehler
(74) *Attorney, Agent, or Firm*—Townsend and Townsend and Crew LLP

(57) ABSTRACT

A wheelchair (10) comprises a seat member (14) pivotally mounted on support beam (16) of a chassis (12). The chassis (12) includes a pair of spaced-apart side elements (18), each depending from the support beam (16) and having a first part (20) supporting a front ground-engaging wheel (22) and a second part (24) supporting a rear ground-engaging wheel (26). A bracing member (32) extends between the second parts (24) of the side elements (18), and supports a variable length strut (68). The variable length strut (68) extends from the bracing member (32) to rearward part (66) of seat member (14) and controls pivotal movement of seat member (14) around support beam (16).

18 Claims, 16 Drawing Sheets

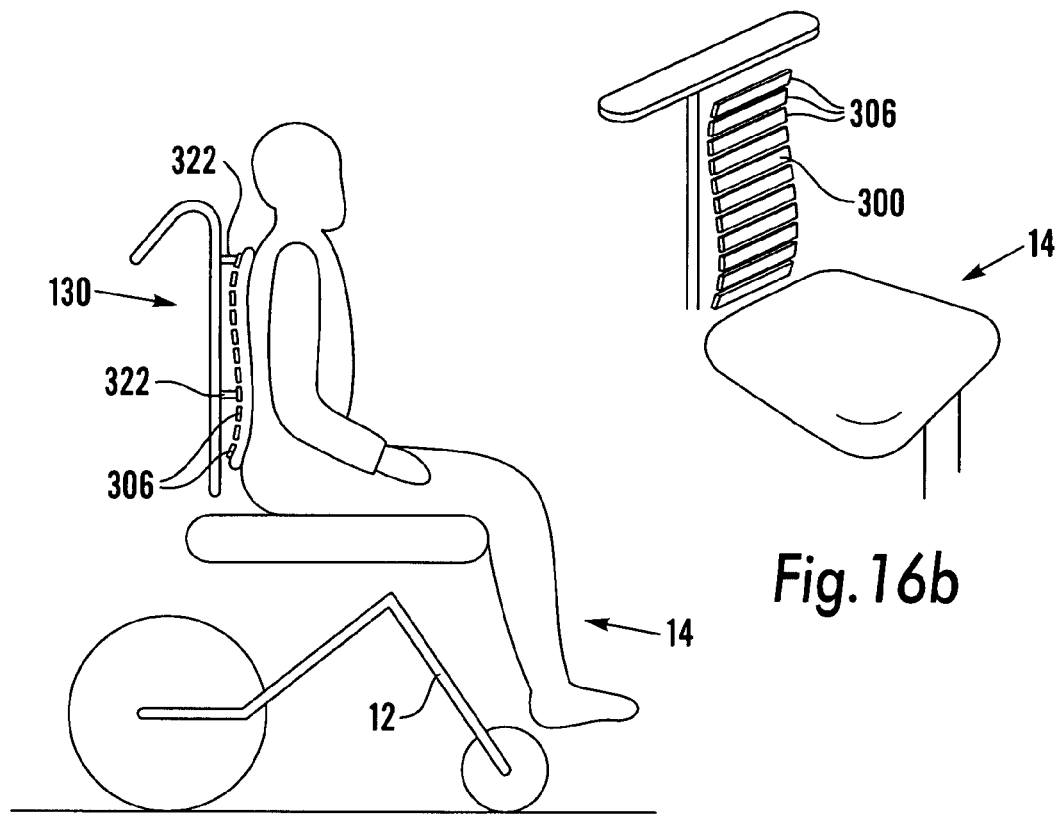
Fig. 16a
Fig. 16b
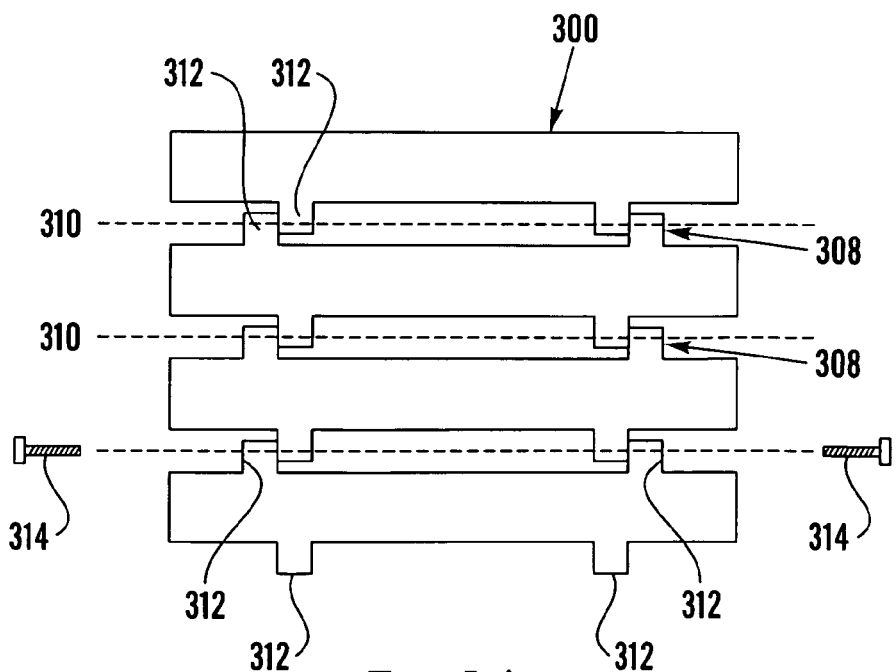
Fig. 16c

WHEELCHAIRS

FIELD OF THE INVENTION

The present invention relates to wheelchairs, particularly but not exclusively to manual and attendant push wheelchairs.

BACKGROUND TO THE INVENTION

Conventional wheelchairs are typically built around a chassis. Often the core of the chassis is a rectangular box-frame, which serves as the principal load-bearing structure of the wheelchair. Components, such as the wheels and seat, and accessories, such as footrests and armrests, can be mounted directly on the chassis.

The inventors have realised that although conventional wheelchairs can be adequate for their essential purpose of providing mobility for persons who are unable to walk (hereinafter referred to as invalids), they have drawbacks. For example, the chassis cannot be readily modified to accommodate invalids of extreme sizes. In addition, the chassis and the components and accessories mounted thereon often cannot be adjusted easily to suit the needs of an invalid, e.g. with particular postural requirements. This means that known wheelchairs may have to be separately modified to suit individual needs. Furthermore, conventional wheelchairs can on the whole be uncomfortable for the invalid and, where they are of the attendant push type, be inconvenient for the attendant to use. A significant drawback is a tendency towards chassis weakness that can make the conventional wheelchair unsuited to withstanding the forces exerted during a crash. This may be particularly important when an invalid is sat in the wheelchair when travelling in a motor vehicle.

European patent application EP 1 059 075A2 discloses a lightweight, variable position wheelchair. U.K. Patent application GB 2 040 237A discloses a wheelchair that is readily dismantled. German Utility Model DE 297 05 494U discloses a sports wheelchair.

SUMMARY OF THE INVENTION

Chassis

According to a first aspect of the invention, there is provided a chassis for a wheelchair, comprising a support beam for supporting a wheelchair seat; a pair of spaced-apart side elements, each depending from the support beam and having a first part for supporting a front ground-engaging wheel and a second part for supporting a rear ground-engaging wheel; and a bracing element extending between the side elements and spaced from the support beam.

The support beam and bracing member span and maintain the spacing between the two side elements. Advantageously, the support beam and bracing member may be extruded sections with a common extrusion profile. The first and second parts of each side element may be disposed on opposite lateral sides of the support member. The bracing member may extend between the second parts of the side elements. The side elements may be mounted to the axial ends of the support beam and bracing member.

In contrast with conventional wheelchairs, the first aspect of the invention allows for a rigid yet open chassis structure that can confer several benefits to both occupant and attendant. For instance, one of the more evident benefits is that the invention can provide for flexibility during manufacture and for ease of modification during use to suit an occupant of a particular size, since the width of the wheelchair may be simply determined by the lengths of the support beam and bracing member. In addition, the simplicity of the chassis, comprising four basic components, can provide a robust structure that is capable of withstanding damage during a crash.

Each side element may be of substantially unitary construction, for example composed of parts which are coupled together to form one self-contained self-supporting structure. For example, each side element may comprise a moulded plastics component (e.g. a structural, foam moulded plastics component). The side element may include strengtheners in the form of reinforcement inserts (e.g. metal plates) embedded in the plastics body. The side elements may be configured to be used interchangeably on either side of the support beam; in other words, the side elements are "non-handed" rather than mirror images of each other, and may be used on either the left hand side or the right hand side of the chassis. The or each side element may have a profile (e.g. defined by an aperture) for securely receiving a restraining belt when transporting the chassis. The profile may also define a handle for lifting the chassis.

Configuring the chassis in the manner proposed may provide an unobstructed space within the wheelchair's footprint towards the front and towards the rear of the wheelchair. The unobstructed space might for example be taken up by ancillary components and accessories or might be made available for the convenience of users e.g. greater accessibility to the seat, especially for attendants guiding/lifting invalids in and out of the wheelchair.

In one embodiment, the second part of at least one side element comprises a forked assembly for engaging opposite ends of a rear wheel axle when mounted therein. The forked assembly may comprise a plurality of spaced-apart axle couplings (e.g. three) whereby the chassis wheel base (distance from front wheel axle to rear wheel axle) depends upon which axle coupling is selected for use. The forked assembly may further comprise a resilient member for use in braking a rear wheel mounted in the forked assembly when so urged. A resilient member may be provided on each line of the formed assembly to provide a calliper braking arrangement. The or each resilient member may be integrally formed in the or each side assembly.

Wheelchair

There is also provided a wheelchair comprising the chassis as hereinbefore defined, and a seat member mounted on the support beam. Front and rear ground-engaging wheels are mounted respectively on each of the first and second parts of each side element. The front ground-engaging wheels may be castors for improving manoeuvrability of the wheelchair. In one embodiment, the rear ground-engaging wheels have a larger diameter than the front ground-engaging wheels.

The seat member defines a platform for supporting a seat. The seat member may comprise a pair of spaced-apart plates. The seat member may be rotatable around a pivot axis, the pivot axes being parallel to a longitudinal axis of the support beam. The pivot axis and the longitudinal axis may be co-linear. The seat member may be coupled to the support beam by at least one bracket. The or each seat member mounting bracket may be disposed between the side elements. The bracket may be configured to allow pivotal movement of the seat member around the support beam for altering seat inclination relative to the chassis. The bracket may also include an arrangement for adjusting spacing between the seat member and the support beam. In this way, the height of the seat member above the ground may be adjusted.

The seat member may extend rearwardly of the support beam, with a rearward portion of the seat member being supported by at least one variable length strut extending from the bracing element. (The seat member may also extend forwardly of the support member). In this way, the seat member is more securely attached to the chassis. The variable length strut may include a shock absorber to dampen tensile and compressive stresses in the strut. The shock absorber may comprise a hydraulic or pneumatic cylinder in the strut. The variable length strut may include a foot pedal trigger for controlling hydraulics/pneumatics when strut length is varied.

The wheelchair may further comprise a back rest detachably coupled to the rearward portion of the seat member. By detaching the back rest from the chassis, the wheelchair may be stored more easily in car boots and the like, where space is limited. The back rest may be mounted on the seat member by a coupling which is adjustable so that the angle of inclination of the back rest to the seat member is variable.

The wheelchair may comprise an anti-tipping bar movable from a first (operative) position for preventing catastrophic backward tipping of the chassis to a second (inoperative) position where backward tipping of the chassis would be unhindered. The use of an anti-tipping bar may help prevent the wheelchair overbalancing backwards, a potential problem when the front ground-engaging wheels are temporarily raised upwards relative to the rear ground-engaging wheels (e.g. when traversing a ramp). However, the presence of the anti-tipping bar may interfere with certain manoeuvres (e.g. traversing a kerb) so there may be occasions when it would be helpful to circumvent the anti-tipping bar. The anti-tip bar may be biased to remain in whichever of the two positions it is placed. In this way, force would need to be applied to overcome the bias before the position of the anti-tipping bar could be changed. The bias mechanism may include an over-centre action. The anti-tipping bar may be pivotally coupled to one side element. The anti-tipping bar may have a lateral member, configured for engagement by a person's foot when being moved between the first and second positions.

The wheelchair may comprise a brake for one rear ground-engaging wheel, the brake being mounted on the second part of one side element and having a braking element movable between a first position urged against its ground-engaging wheel and a second position spaced from its ground-engaging wheel. The braking element may be biased to remain in whichever of the first and second positions it is placed. The braking element may be mounted on a lever, with the lever having an over centre locking action biased by resilience between the rear ground-engaging wheel and the braking element. The resilience may be provided by a resilient tyre on the respective wheel.

The wheelchair may comprise a leg rest assembly pivotally coupled to the seat member, the leg rest assembly being releasably held at a predetermined inclination relative to the seat member by a support arm extending from the chassis. In use, the leg rest assembly provides leg support for the wheelchair's occupant. However, there are times when it is desirable to move the leg rest assembly from its operative position, for example when the occupant wishes to leave the wheelchair. If the seat member extends forwardly of the support beam, and the leg rest assembly is pivotally coupled to such a forward portion of the seat member, the leg rest assembly may be pivoted underneath the seat member (and out of the occupant's way) when released from being held at the predetermined inclination.

The support arm may be pivotally coupled to the support beam. In this way, the presence of the leg rest assembly will not impede rotational positioning of the seat member around the support beam; the leg rest assembly and seat member will rotate as one around the support beam. The predetermined inclination of the leg rest assembly relative to the seat member may be variable, and may be determined by varying positional engagement between the leg rest assembly and support arm relative to the seat member. The predetermined inclination may be varied by adjusting the length of the support arm.

Rotatable Coupling

In accordance with another aspect of the present invention, there is provided apparatus for rotatably coupling one elongate member (e.g. a first tubular component) to another elongate member (e.g. a second tubular component), comprising: a first part for mounting around one elongate member and having a longitudinal axis; and a second part for mounting on the other elongate member, comprising a body having an aperture in which the first part is a sliding fit, a slot extending from the aperture to an exterior surface of the body, and a releasable biasing device extending through the body from one side of the slot to the other which in use is configured to urge the sides of the slot together to clamp the body around the first part when received in the aperture, wherein the second part is rotatable around the longitudinal axis of the first part when the biasing device is released.

Typically, the first part will be mounted on one elongate member somewhere between its respective ends, whereas the second part will be mounted to one end of the other elongate member. The longitudinal axis of the first part may be parallel to that of the elongate member to which it is mounted; the axes may be spaced apart. The first part may have a cylindrical outer periphery, and the aperture in the second body may have a corresponding shape so that the first part is a snug fit in the aperture. In this way, the second part (with its respective elongate member) is rotatable around the longitudinal or central axis of the cylindrical periphery of the first part, when the biasing device is released. The first part may include at least one guide member (e.g. annular flange) on the cylindrical periphery for guiding movement of the second art around the first part. The guide member is configured to help prevent the second part from sliding off the first part when the biasing device is released.

One part may include a resilient member (e.g. leaf spring) having a profile which is configured to engage a corresponding recess in the other part when the profile and recess are in registration. For example, the recess may be provided in the cylindrical outer periphery of the first part and the resilient member may be mounted on the second part. Interengagement of the profile and recess provides a positive location action, enabling a pre-set orientation to be restored after rotation of the second part around the first part. This may be extremely useful in applications where specific orientations are important and need to be determined by skilled individuals e.g. medical qualified persons. Once the orientation is determined, the first part may be mounted on its elongate member and secured against rotation so that the second part will reliably and repeatedly adopt the set orientation. For example, in a wheelchair, the apparatus may be used to couple an elongate member of an arm rest to an elongate member of a seat frame, and an elongate member of a leg rest to another elongate member of the seat frame.

The releasable biasing device may comprise a cam drive which is attached to one side of the slot and configured to bear against the other. The cam drive may be operated by a lever. The lever may be moveable from a first position protruding from the body to a second position flush against the body when urging the two sides of the slot together. The cam drive may have an over centre action whereby the lever is biased to remain in the second position. Alternatively, or in addition, the lever may include a clip for engaging the elongate member to which the second part is mounted when in the second position. The lever may abut the resilient member when in the second position, blocking disengagement of the profile from the recess.

Wheel

In accordance with another aspect of the present invention, there is provided a wheel for a castor assembly, comprising a hub having an axis of rotation, a ring-like member having a central axis and a rigid outer periphery for ground engagement, and a resilient suspension disposed between the ring-like member and the hub, whereby the central axis of the ring-like member is moveable relative to the axis of rotation of the hub in response to elastic deformation of the resilient suspension.

The applicant has appreciated that castor wheels with resilient tyres are desirable because of the cushioning effect they provide, and yet undesirable because of the high static friction encountered between the wheels and the ground, particularly on carpeted surfaces. The wheel in accordance with the present invention delivers an equivalent cushioning effect, and yet the hard or rigid exterior is easier to push over the ground because of the reduced frictional resistance. At the same time, the ring-like member is secured to the hub by the resilient suspension to prevent the ring-like member rotating independently of the hub.

The wheel may comprise a guide arrangement for maintaining the central axis of the ring-like member parallel to the axis of rotation of the hub. The guide arrangement resists forces which might otherwise cause the ring-like member to move in an axial direction relative to the hub due to resilience of the suspension. The guide arrangement may comprise on opposite sides of the hub and ring-like member a raised profile on one side which is a sliding fit in a recess in the other side. For example, the raised profile may comprise a flange, and the recess may comprise a groove in which the flange is a snug sliding fit. When the central axis of the ring-like member and the rotation axis of the hub are coaxial, the flange may be partially received in the groove thereby allowing for sliding movement in opposite (radial) directions. The raised profile (e.g. flange) may be disposed on the radially inner periphery of the ring-like member, and the recess (e.g. groove) may be disposed on the radially outer periphery of the hub.

There may be provided a push-type wheeled conveyance (e.g. pushchair, wheelchair or shopping trolley) comprising a chassis with at least one castor assembly including a ground-engaging wheel as hereinbefore defined. The chassis may be in accordance with a first aspect of the present invention.

Back Rest

In accordance with another aspect of the present invention, there is provided a support surface (e.g. back rest) for a chair, comprising a plurality of slats (or laths) arranged side by side, with each adjacent pair of slats hinged together by a hinge coupling allowing pivotal movement of one slat relative to the other around a respective pivot axis, wherein at least one of the hinge couplings is lockable to maintain a predetermined orientation between its respective pair of slats.

The support surface may be particularly useful when used as part of backrest. Slat articulation allows a profile to be created which may be tailored to suit individual requirements (for comfort) or medical requirements (for correct posture). The pivot axis of each adjacent pair of slats may be disposed between its respective pair of slats. The pivot axes of the hinge couplings may be parallel to one another. Each adjacent pair of slats may comprise a pair of hinge couplings, spaced apart along the respective pivot axis.

The support surface may comprise a rigid framework to which at least two of the slats are mounted. Typically, the at least two slats mounted to the rigid framework will be at or towards each lateral end of the support surface. Remaining slats may be moveable relative to the rigid framework when the or each of hinge couplings is unlocked. At least one of the slats may be mounted to the rigid framework by an adjustable coupling for varying spacing between the said slat and the rigid framework.

The or each lockable hinge coupling comprises a pair of hinge supports, each mounted on one slat and projecting towards the other of its respective pair of slats. A bolt may extend through the hinge supports (e.g. along the respective pivot axis) and may be configured to tighten one hinge support against the other when the predetermined orientation is achieved.

There may also be provided a wheelchair comprising a seat with a backrest, the backrest including a support surface as hereinbefore defined.

Braking Device

In accordance with yet another aspect of the present invention, there is provided a push-type wheeled conveyance such as a pram or wheelchair, comprising a chassis supporting at least one ground-engaging wheel, and a resilient member being urgeable from a first position spaced from the at least one ground-engaging wheel to a second position in contact with the at least one ground-engaging wheel for resisting rotation thereof.

The resilient member is configured to adopt a rest position (first position) where the at least one ground-engaging wheel (e.g. rear wheel) is able to rotate unhindered by it. The resilient member may be urged manually into the second (operative) position by a person pushing the wheeled conveyance.

The resilient member may extend from the chassis over the at least one ground-engaging wheel, so as to engage an upper portion of the at least one ground-engaging wheel when in the second position. The resilient member may be configured to act as a mud or hand guard for the at least one ground-engaging wheel when in the first position. For example, the resilient member may be wider than the at least one ground-engaging wheel to block debris thrown up by wheel rotation from the ground. The guard may also prevent hands from accidentally coming into contact with the wheel when rotating.

The resilient member may include a clip for releasably attaching the resilient member to the at least one ground-engaging wheel when the resilient member is in the second position. The clip may be attached to the wheel to provide a parking brake.

The chassis may be in accordance with the first aspect of the present invention.

A push-type wheeled conveyance (e.g. a pram or wheelchair), comprising a chassis supporting at least one ground-engaging wheel, and mudguard mounted on the chassis and extending over the at least one ground-engaging wheel, wherein the mudguard is moveable from a first position spaced from the at least one ground-engaging wheel to a second position in contact therewith to resist wheel rotation. The mudguard may be resilient and able to flex between the first and second positions.

Chair

In accordance with yet another aspect of the present invention, there is provided a chair for a wheelchair, comprising a base supporting a back rest and a platform slidably mounted on the base for movement relative to the back rest, the platform being configured to carry an individual seated thereon.

The platform may be movable between a first position and a second position (even when carrying the individual), with the second position being closer to the back rest than the first position. The chair may be used advantageously in a wheelchair to allow the invalid to be moved once seated into a position where their lower back is correctly supported by the back rest simply by moving the platform from the first to the second position. This reduces the risk that the invalid will adopt an incorrect or "slumped" position when seated in the chair.

The chair may comprise a prime mover for controlling movement of the platform relative to the backrest. The prime mover may comprise a rack and pinion arrangement, and the rack may be mounted to the underside of the platform. The prime mover may further comprise a lever for manually rotating the pinion to move the platform. The lever may be positioned for manual operation from behind the back rest. The lever may also be configured for stowage underneath the platform, when the platform is in the second position.

The chair may further comprise a releasable lock for locking the platform in the second position. The lock helps to prevent the platform moving accidentally towards the first position when the chair is being used. The lock may be configured to engage automatically when the platform reaches the second position. The releasable lock may comprise one part mounted on the platform and another part mounted on the base, with one of the parts being configured to resiliently engage the other when registered therewith.

BRIEF DESCRIPTION OF THE DRAWINGS

Specific embodiments of the different aspects of the invention will now be described in detail, by way of example, and with reference to the accompanying drawings in which:

FIGS. 16a, 16b and 16c show side, perspective and detail views of a support surface according to yet another aspect of the present invention;

DETAILED DESCRIPTION OF SPECIFIC EMBODIMENTS

Figure 1:
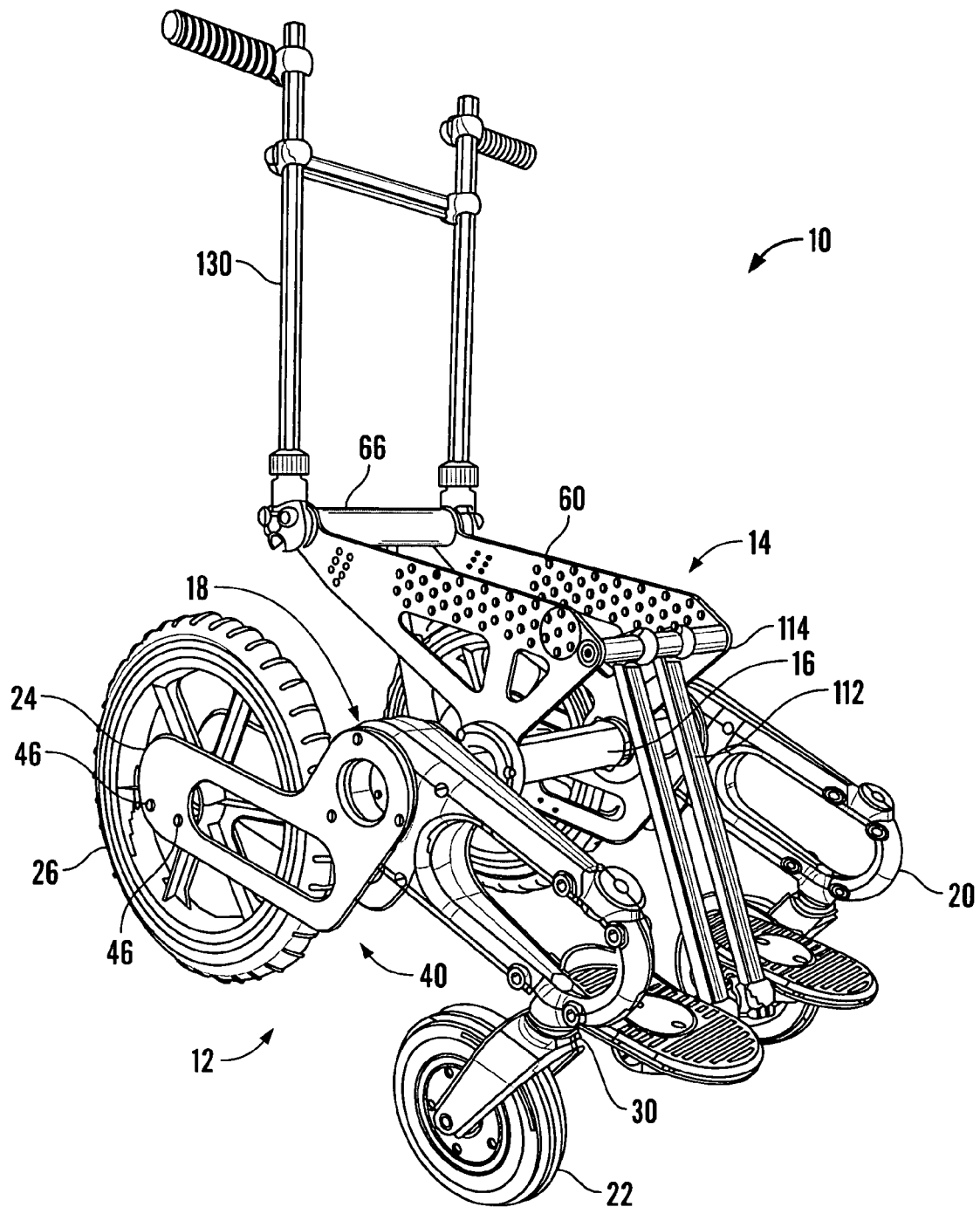
FIG. 1 is a front perspective view from one side and above of a wheelchair embodying one aspect of the present invention.
Figure 2:
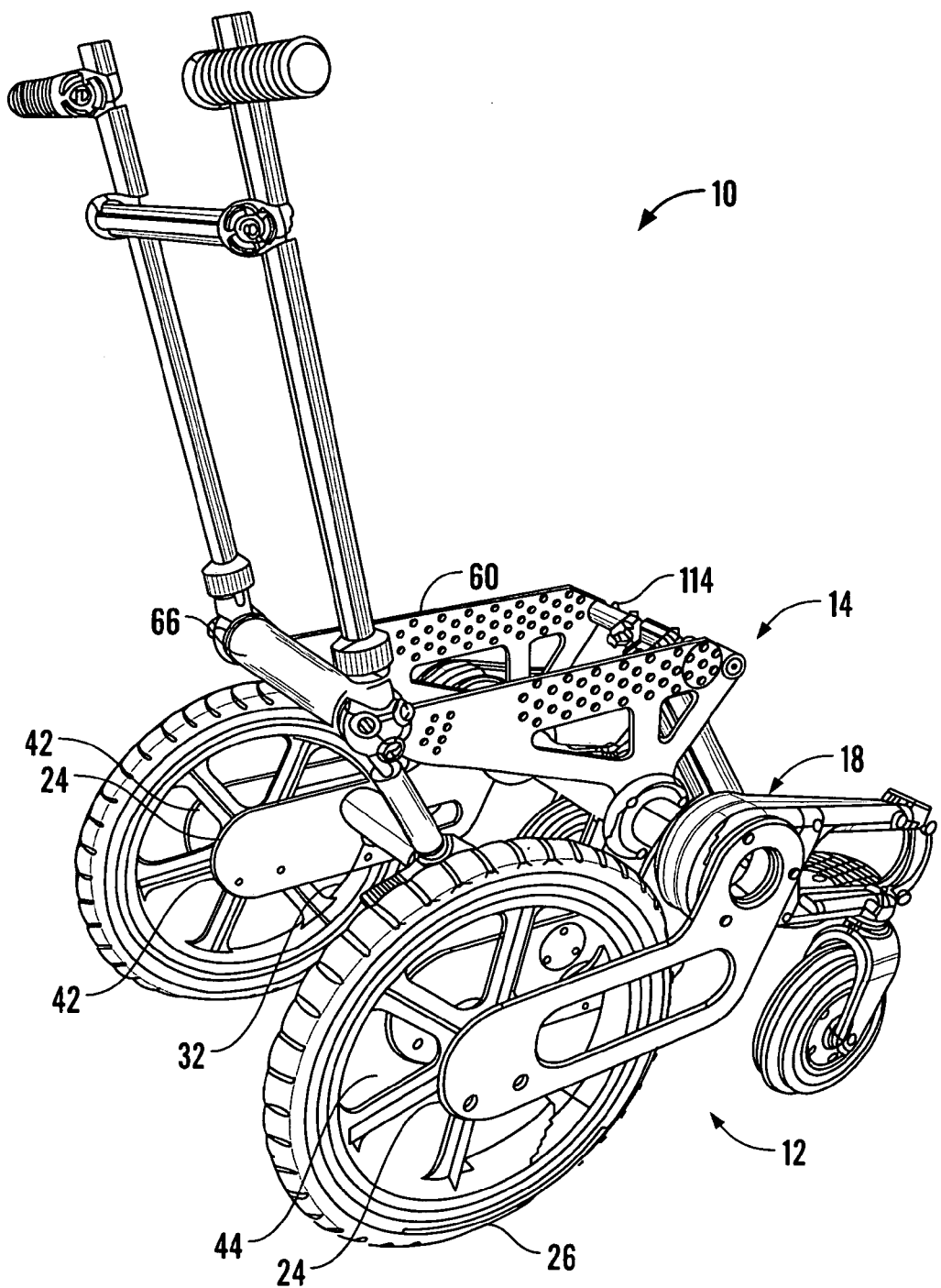
FIG. 2 is a rear perspective view from one side and above of the wheelchair of FIG. 1.

FIGS. 1 and 2 show a wheelchair (10) comprising a chassis (12) and a seat member (14) mounted on the chassis (12). The chassis (12), which is shown in more detail in FIG. 3, comprises a horizontal support beam (16) which extends between a pair of spaced apart side elements (18). Each side element (18) depends from the support beam (16) and has a first part (20) supporting a front wheel (22) and a second part (24) supporting a rear wheel (26). The first and second parts (20,24) are disposed on opposite lateral sides of the support beam (16). Each front wheel (22) is part of a castor assembly (30) which is mounted on the first part (20). A bracing member (32)—parallel to and spaced from support beam (16)—extends between the second parts (24).

Each second part (24) includes a forked arrangement (40) with tines (42) defining therebetween a channel (44) in which at least part of the respective rear wheel (26) is received. The tines (42) may include two or more spaced-apart axle couplings (46), each capable of receiving the rear axle (48) of one of the rear wheels (26). The axle couplings (46) allow the wheel base "L"—that is, the spacing from the front axle (50) to the rear axle (48)—to be varied. Each rear wheel (26) may be mounted in any one of the axle couplings (46) using so-called "quick release" couplings.

Figure 3:
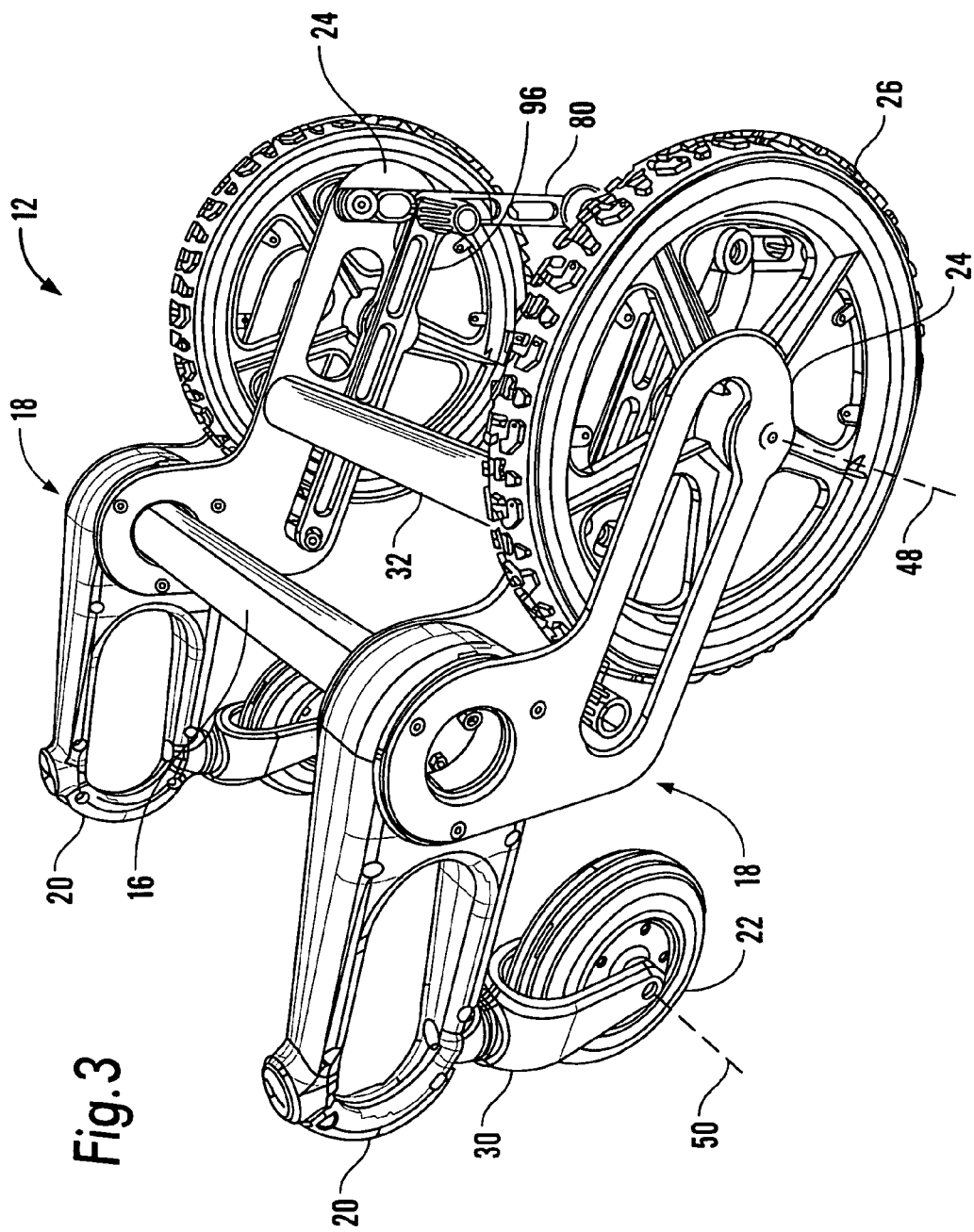
FIG. 3 is a perspective view of chassis detail of the wheelchair of FIG. 1.
Figure 4:
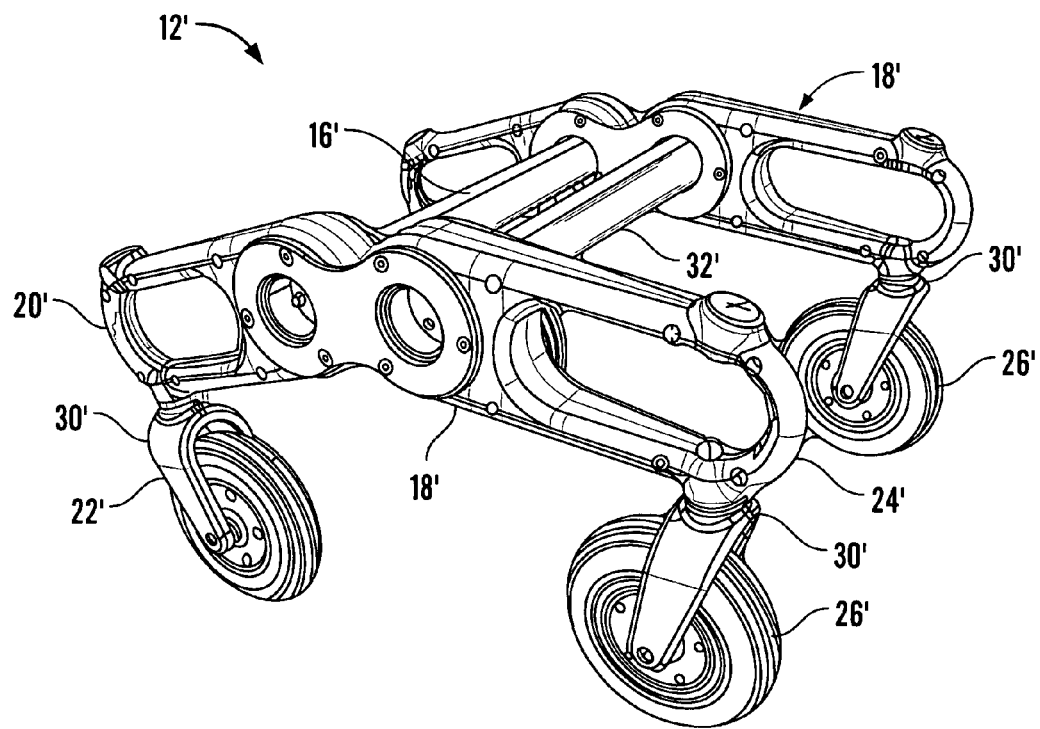
FIG. 4 is a perspective view showing detail of a modified chassis.

FIG. 4 illustrates an alternative chassis arrangement (12'), in which features in common with those of FIG. 3 are labelled with the same reference number, marked with a "'". As can be seen, the second parts (24') of the side elements (18') are a mirror image of the first parts (20'), with all four wheels (22' and 26') each being part of a respective castor assembly (30').

Figure 5:
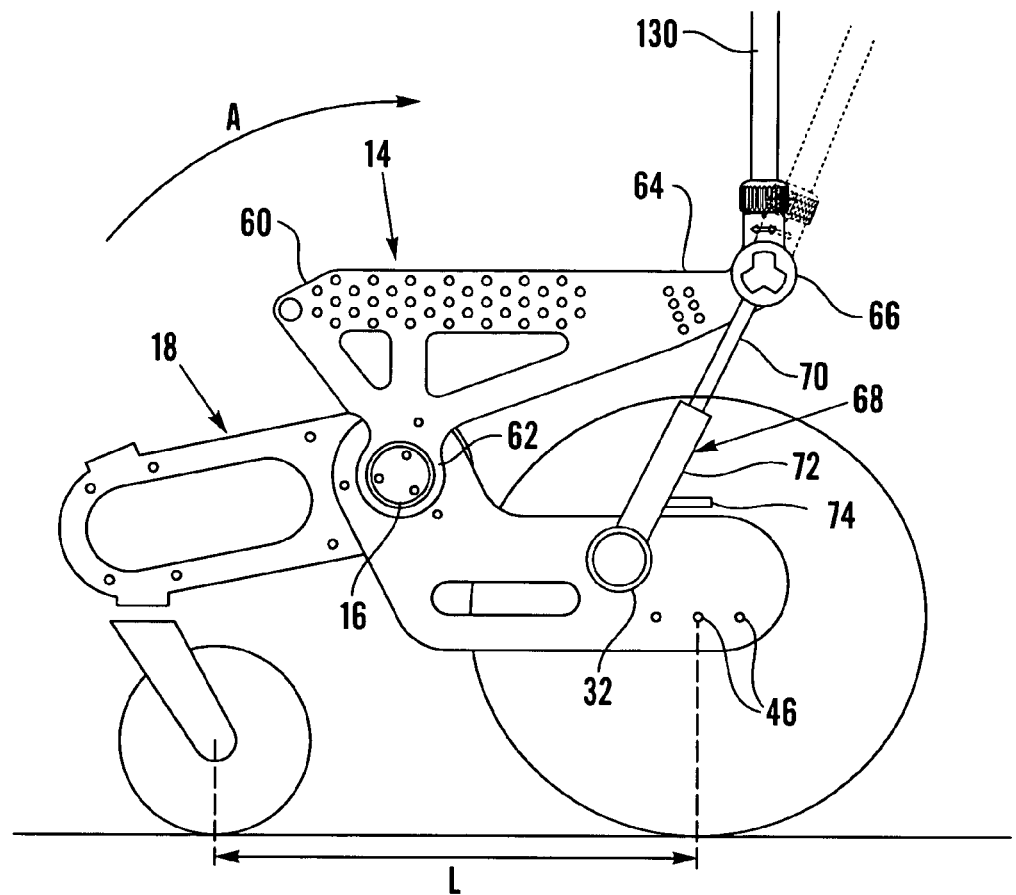
FIG. 5 is a schematic sectional view showing detail of the wheelchair of FIG. 1.

FIG. 5 shows schematically how the seat member (14) (comprising plates (60)) is attached to chassis (12). The seat member (14) is rotatably mounted on support beam (16) and a mounting bracket (62) is provided to centre the seat member on chassis (14). The plates (60) of seat member (14) extend rearwardly of the support beam (16), and a rearward portion (64) of each is coupled to a respective end of a tube (66). The tube (66) is supported by a variable length strut (68) which is mounted on bracing member (32). The strut (68) is pivotally mounted at each end and comprises a rod

(70) which is a sliding fit in housing (72). A foot pedal (74) operates a locking mechanism (not shown) in housing (72) which allows the rod (70) to move relative to the housing (72) when the foot pedal (74) is operated. With the foot pedal (74) depressed, the seat member (14) is free to rotate in direction arrow A around the support member (16).

Figure 6A:
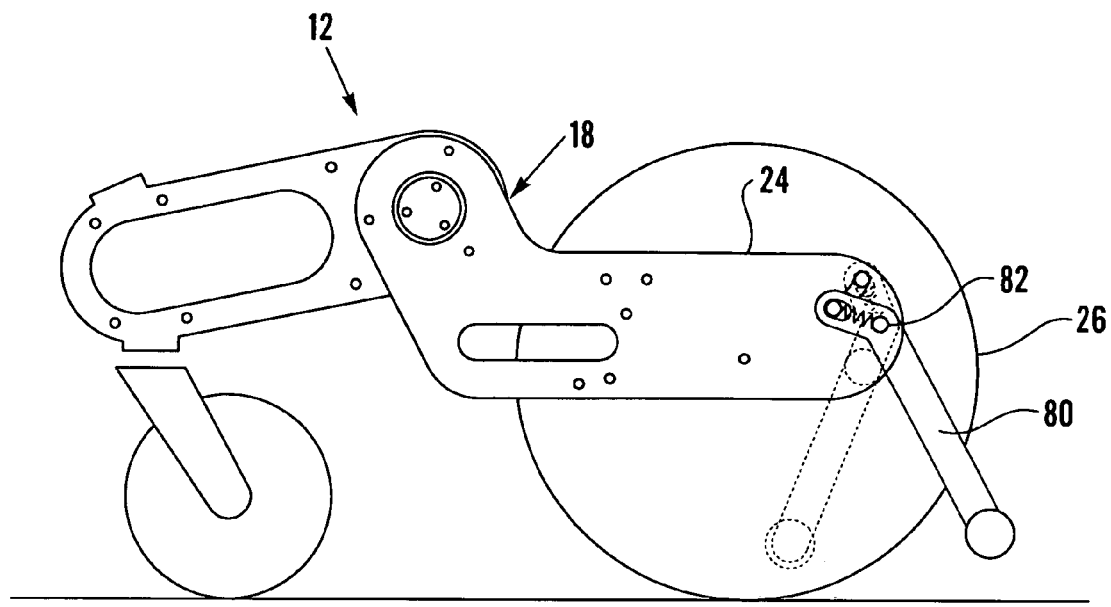
FIGS. 6a and 6b are schematic sectional views showing anti-tipping bar details of the wheelchair of FIG. 1.
Figure 6B:
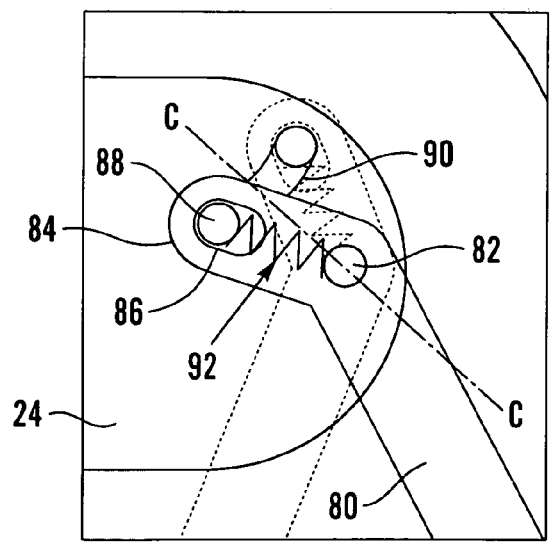

FIGS. 6a and 6b show schematically how an anti-tipping bar (80) may be deployed on chassis (12) for preventing catastrophic backward tipping of wheelchair (10). The anti-tipping bar (80) is pivotally coupled at pivot point (82) to the second part (24) of one of the side elements (18). The anti-tipping bar (80) is movable from a first position where it projects behind rear wheel (26) to a second position (shown in phantom lines) concealed underneath chassis (12). It is only when the anti-tipping bar (80) is in the first position that catastrophic backward tipping of the wheelchair (10) can be arrested.

As shown best in FIG. 6b, end (84) of anti-tipping bar (80) has an oval aperture (86) in which pin (88) is a sliding fit. The pin (88) is also slidably received in arcuate slot (90), the two ends of which are equidistant from pivot point (82) and determine limits of pivotal movement of the anti-tipping bar (80). The pin (88) is biased away from pivot point (82) by spring (92). Thus, as the tipping bar (80) moves from the first position to the second position, the pin (88) slides around arcuate slot (90), which forces the pin (88) to move in oval aperture (86) towards the pivot point (82) against the spring bias. However, once the pin (88) passes notional central line (CC), the spring bias urges the pin (88) to move away from the pivot point (82) during the remainder of pin travel in arcuate slot (90). In this way, the anti-tipping bar (80) remains in whichever of the first and second positions it is placed.

Figure 7A:
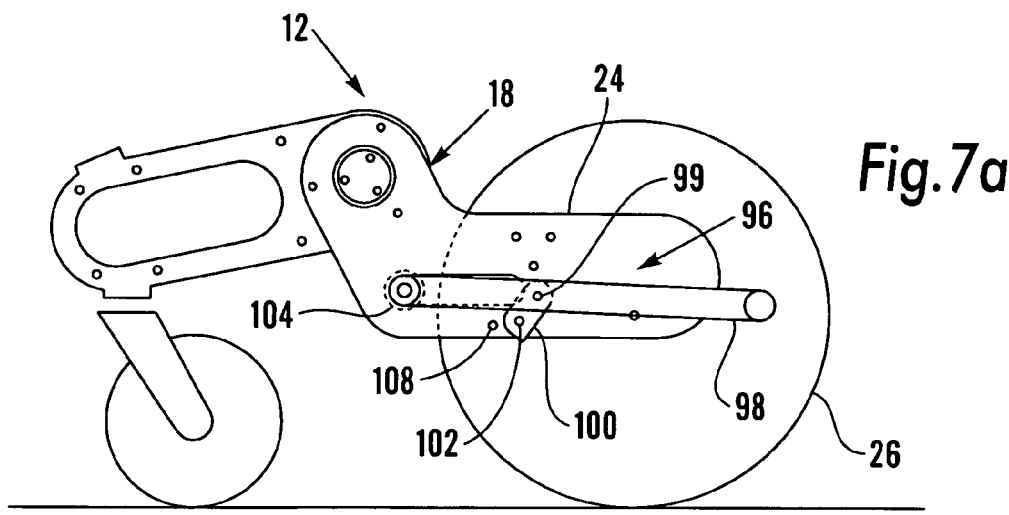
FIGS. 7a, 7b and 7c are schematic sectional views showing brake details of the wheelchair of FIG. 1.
Figure 7B:
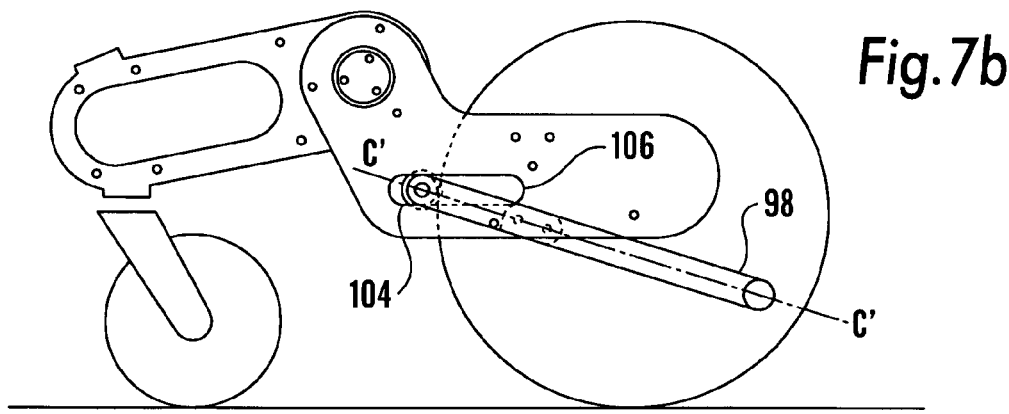
Figure 7C:
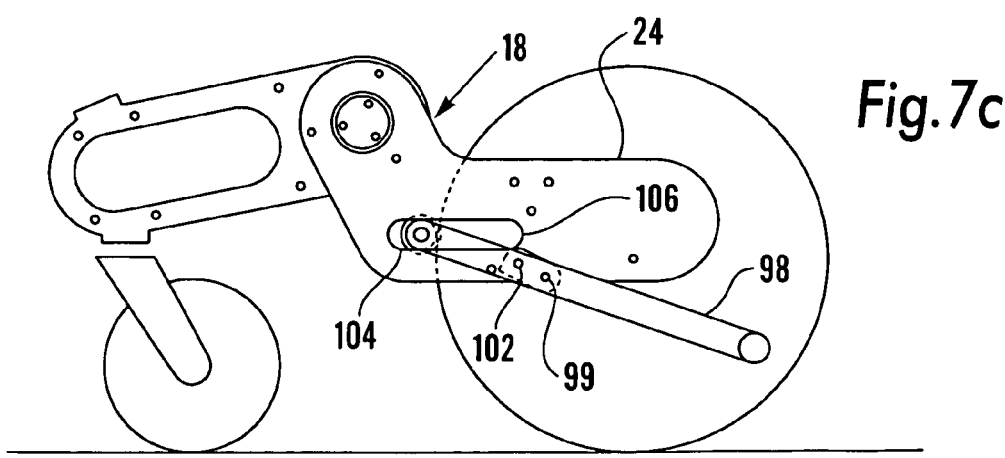

FIGS. 7a, 7b and 7c show schematically how a brake (96) may be deployed on chassis (12) for preventing rotation of rear wheel (26). The brake (96) comprises a lever (98) pivotally coupled at pivot point (99) to link (100) which is pivotally coupled at pivot point (102) to the second part (24) of one of the side elements (18). A braking element (104) is mounted on the lever (98) and extends laterally through oval aperture (106) in second part (24). The braking element (104) is configured to reciprocate in oval aperture (106) in dependence upon lever (98) movement. The braking element (104) moves from a first position (brake off) shown in FIG. 7a to a second position (brake on) shown in FIG. 7c, in response to downward movement of lever (98).

FIG. 7b shows the configuration of brake (96) in between the first and second positions. The braking element (104) has engaged tyre (108) of rear wheel (26), and resilience of one or other is providing a bias against further movement of the braking element (104) along oval aperture (106). At this moment, the pivot points (99 and 102) are aligned with notional centre line (C'C'), with the braking element (104) at its closest to pivot point (102). Thus, continued downward movement of lever (98) pushes pivot point (99) across the centre line (C'C'), resulting in the braking element (104) starting to move back along oval aperture (106) away from tyre (108). However, before the braking element (104) disengages the tyre (108), further rotation of link (100) is prevented by stop (108). In this way, the braking element (104) is maintained in the second position by the resilient bias generated by contact between the tyre and the braking element. The brake (98) may be released by overcoming the resilient bias encountered when raising the lever 98.

Figure 8A:
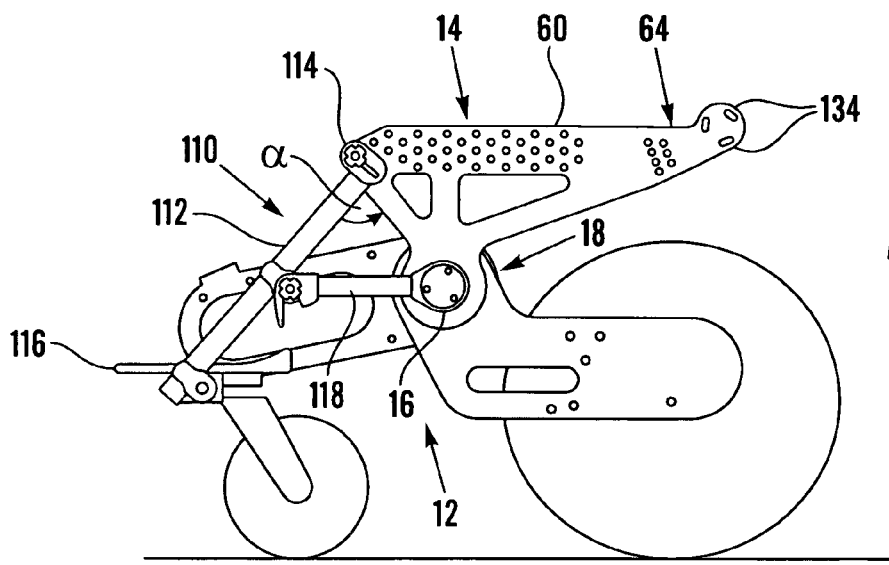
FIGS. 8a, 8b and 8c are schematic sectional views showing leg rest assembly details of the wheelchair of FIG. 1.
Figure 8B:
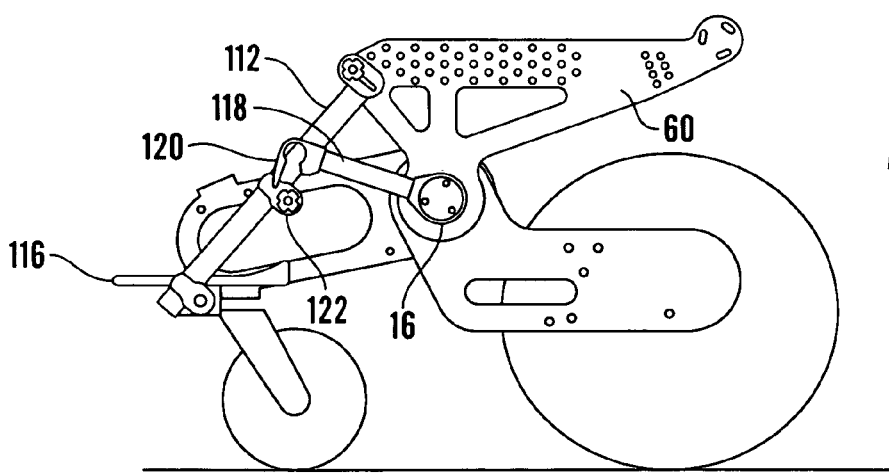
Figure 8C:
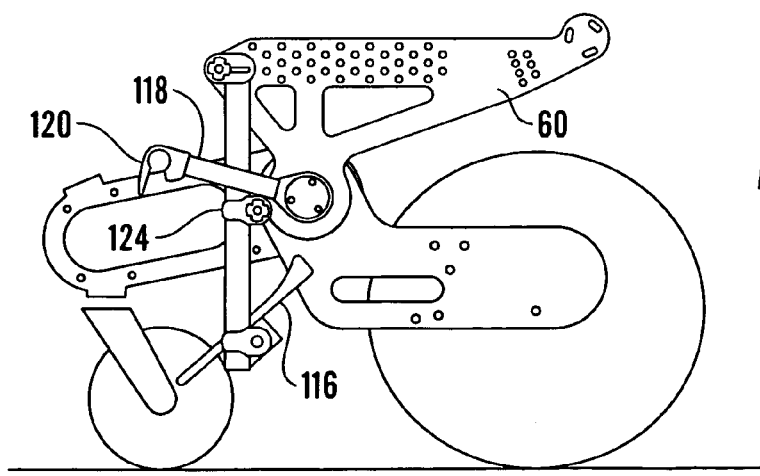

FIGS. 8a, 8b and 8c show schematically how a leg rest assembly (110) may be fixed to a wheelchair (10). The leg rest assembly comprises a pair of elongate members (112), each depending from a horizontal bar (114) at the front of seat member (14). A foot plate (116) is mounted at the end of each elongate member (112) furthest from the seat member (14). The bar (114) is rotatably mounted between and coupled to plates (60) of seat member (14), allowing the foot plates (116) to be moved from an operative position (FIG. 8a), with elongate members (112) inclined at a predetermined angle "α" to the plates (60), to an inoperative position, stowed underneath seat member (14). The elongate members (112) are releasably held at the predetermined angle "α" by a support arm (118) pivotally mounted on support beam (16). The support arm (118) includes a clip (120) which frictionally engages a lug (122) coupled to and extending between the elongate members (112). By removing clip (120) from lug (122), the support arm (118) is free to rotate clockwise (as shown in FIG. 8b) around the support beam (16). Once the clip (20) is free of lug (122), the leg rest assembly (110) is able to pivot from the operative position to the inoperative position.

The predetermined angle "α" may be varied by adjusting the position of lug (122) along the length of the elongate members (112), i.e. the distance of lug (122) from bar (114). Thus lug (122) may be mounted on a collar (124) which is a sliding fit on at least one elongate member (112), with the collar having a locking mechanism (e.g. grub screw) to secure it to the at least one elongate member (112) once its desired position is chosen. It will be appreciated that the leg rest assembly (110) is able to move with the seat member (14) at the predetermined angle "α", since both the plates (60) and the support arm (118) are rotatably mounted on support beam (16).

Figure 9:
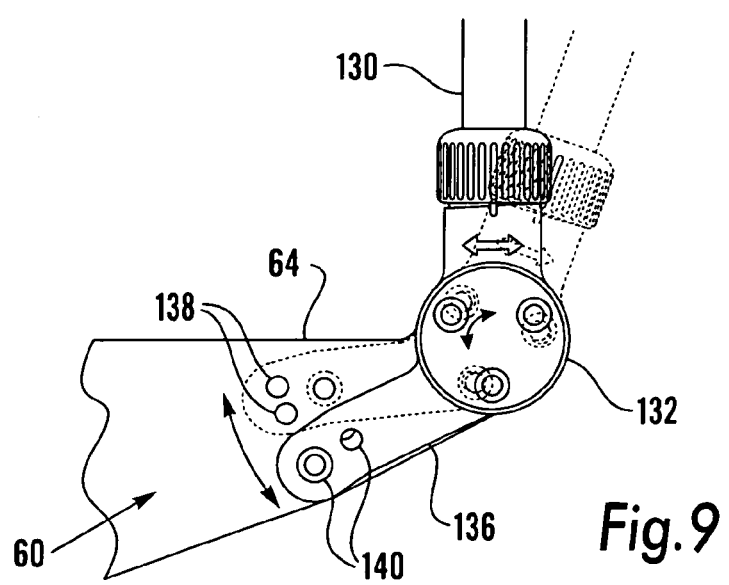
FIG. 9 shows detail of backrest tilt adjustment of wheelchair of FIG. 1.

FIG. 9 shows schematically some detail of a back rest (130) of seat member (14), the position of which may be adjusted from an upright position to an inclined position (shown in phantom lines). The back rest (130) is adjustably mounted via bracket (132) to the rearward portion (64) of plates (60). The rearward portion (64) includes three arcuate slots (134)—as shown in FIGS. 8a to 8c—each for receiving a bolt (not shown) securing bracket (132) to the tube (66) extending between plates (60). The position of each bolt within its respective slot (134) is determined by the position of arm (136) relative to the rearward portion (64) of plates (60). A plurality of apertures (138) are provided in the rearward portion (64) which are selectably registrable with apertures (140) in arm (136). The inclination of the back rest (130) is thus determined by selecting which of apertures (138) are registered with apertures (140) in the arm (136). Once the appropriate apertures are registered, a locking pin (not shown) may be used to secure the desired back rest inclination.

Figure 10:
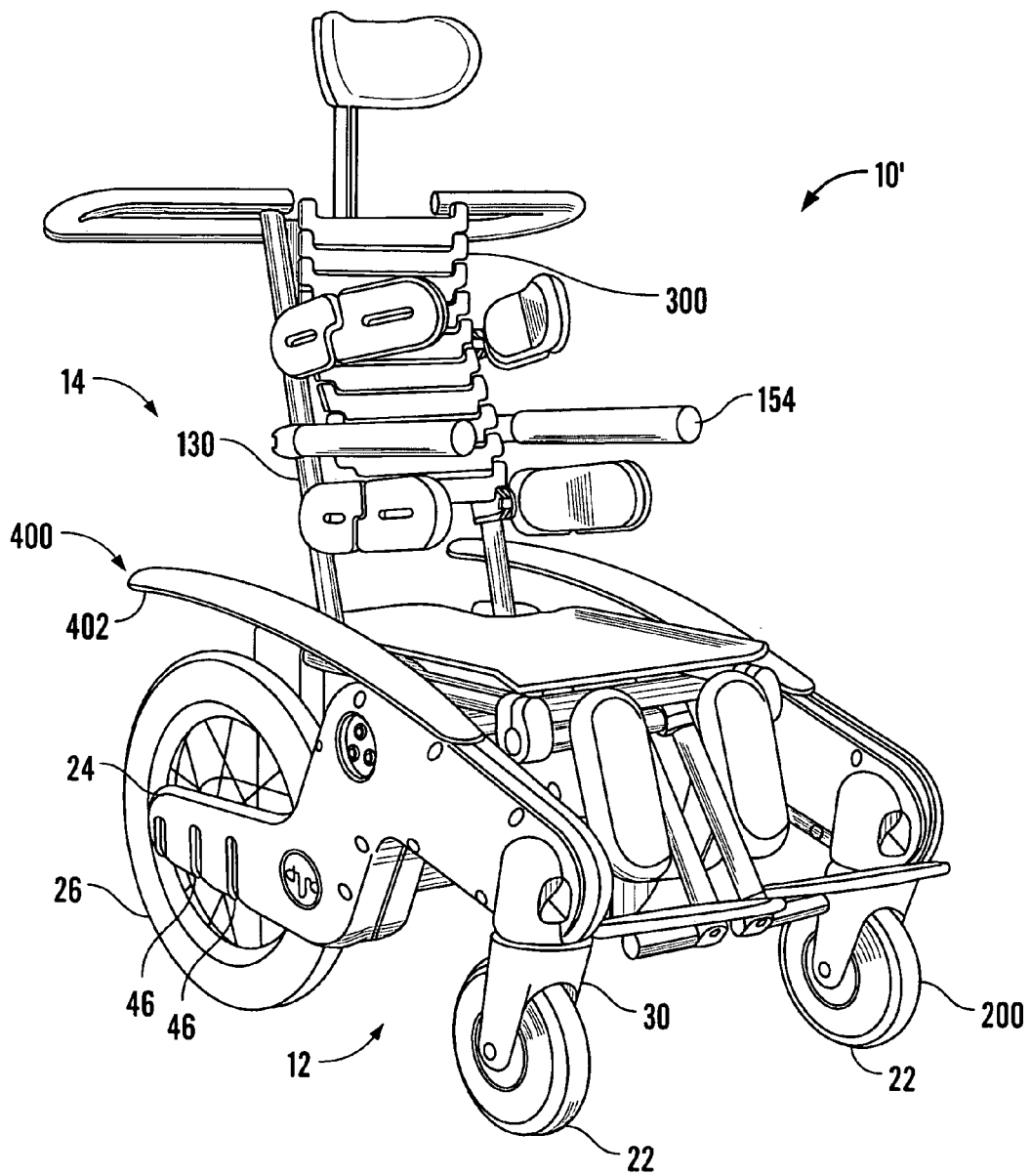
FIG. 10 shows a front perspective view from one side and above of another wheelchair embodying one aspect of the present invention.
Figure 11:
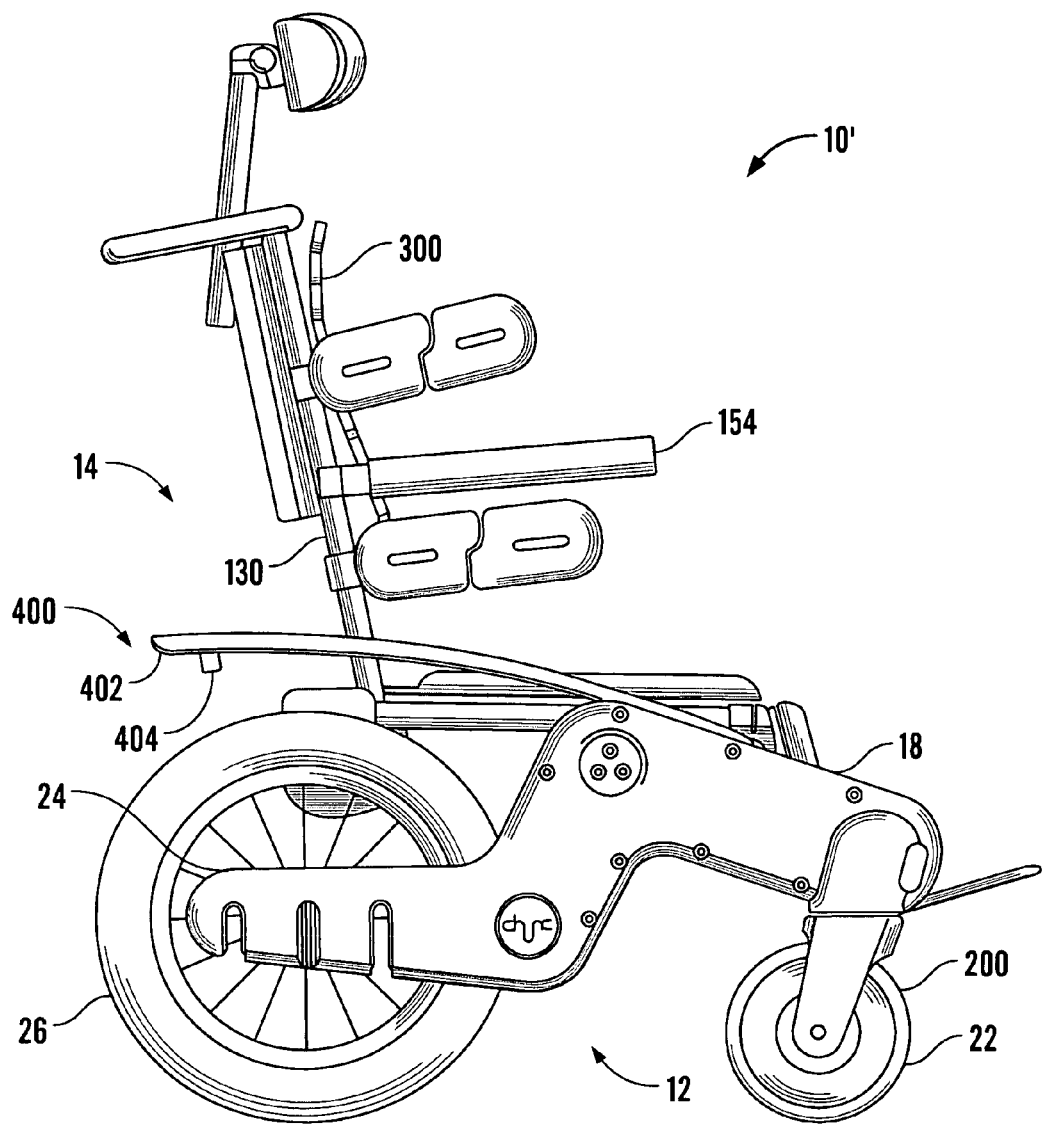
FIG. 11 shows a side view of the wheelchair of FIG. 10.

FIGS. 10 and 11 show an alternative wheelchair (10') embodying the present invention. For ease of understanding, features common to wheelchair (10) and wheelchair (10') share the same reference number.

Rotatable Coupling

Figure 12:
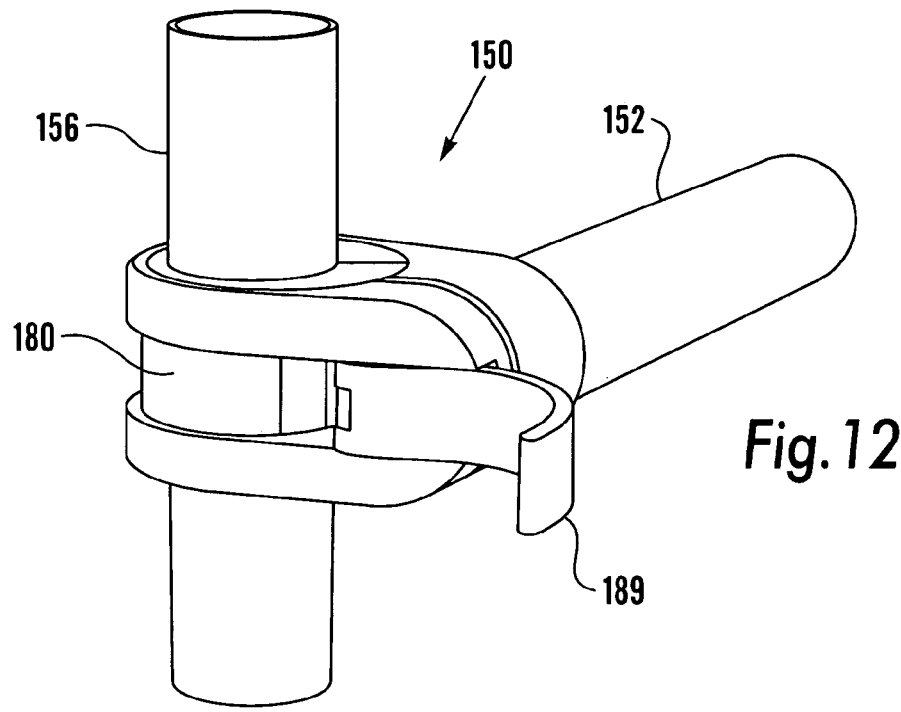
FIG. 12 is a perspective view of a rotatable coupling embodying another aspect of the present invention.
Figure 13:
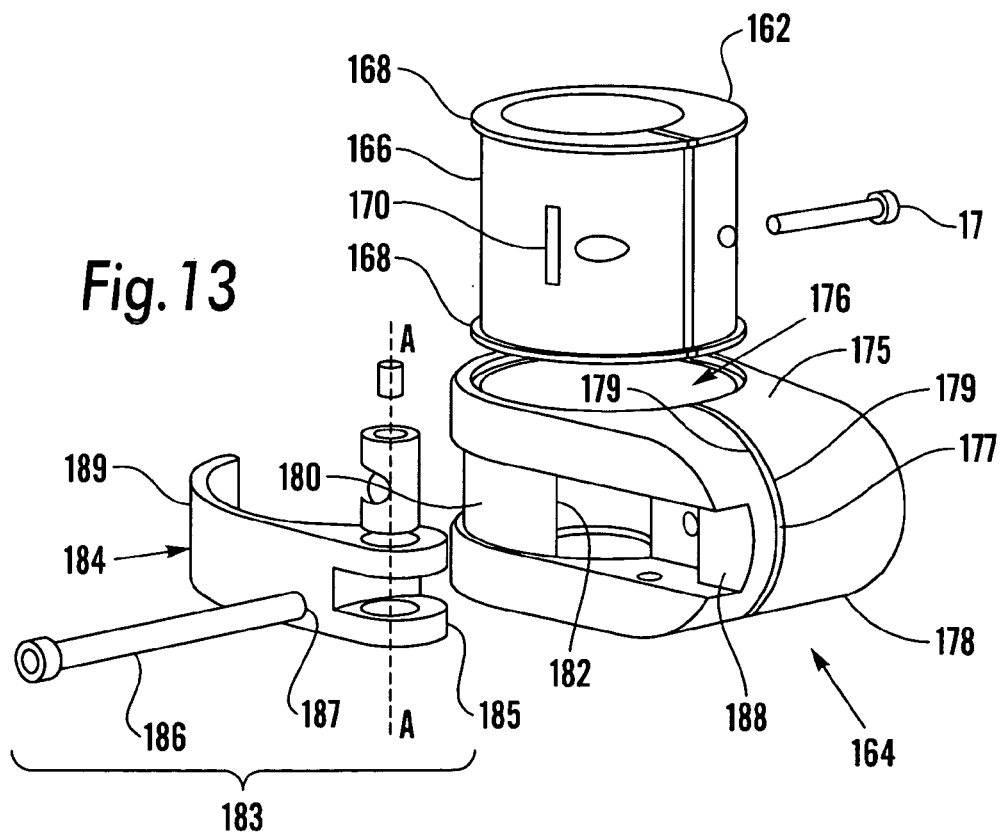
FIG. 13 is an exploded perspective view showing detail of the rotatable coupling of FIG. 11.

FIGS. 12 and 13 show a rotatable coupling (150) which may be used to couple a first (horizontal) elongate member (152) of an accessory [e.g. arm rest (154)] to a second (vertical) elongate member (156), [e.g. backrest (130)]. The coupling (150) comprises a first part (162) which is fitted around the vertical member (156) and a second part (164) which is fitted to an end of the horizontal member (152).

The first part (162) has a cylindrical outer periphery (166), banded top and bottom by radial flanges (168). The cylindrical outer periphery (166) includes a recess (170) which is aligned in a predetermined position when the first part (162) is clamped around the vertical member (156) by tightening bolt (172).

The second part (164) has a body (175) having a cylindrical aperture (176) for slidably receiving the first part (162). A slot (177) extends through the body (175) from the aperture (176) to the exterior surface (178) of the body (175). The slot (177) forms a pair of jaws in the body (175), with opposing sides (179) of the slot (177) being moveable towards each other by flexure of the body (175). The body includes a resilient member (180) (e.g. leaf spring) which has a raised profile (181) on its free end (182) which projects into the recess (170). The raised profile (181) is a snug fit in recess (170) in the first part (162), when the profile (181) and recess (170) are in registration.

The second part (164) includes a releasable biasing device (183) which includes a lever operated cam drive (184) defining cam surface (185). The cam drive (184) is coupled to the body (175) by bolt (186) which extends through both sides (179) of the slot (177), with its leading end (187) anchored in the horizontal member (152). When the leading end (187) is anchored accordingly, the cam surface (185) abuts and bears against a corresponding surface (188) of the body (175). The cam surface (185) and corresponding surface (188) are configured so that movement of lever (189) around axis (AA) urges sides (179) of slot (177) together, thereby restricting aperture (176).

Figure 14A:
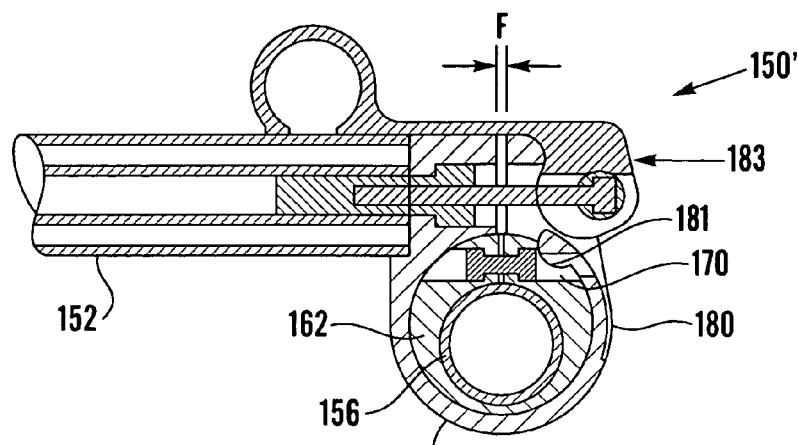
FIGS. 14a, 14b and 14c are sectional views showing different stages of use of a rotatable coupling according to another embodiment of one aspect of the invention.
Figure 14B:
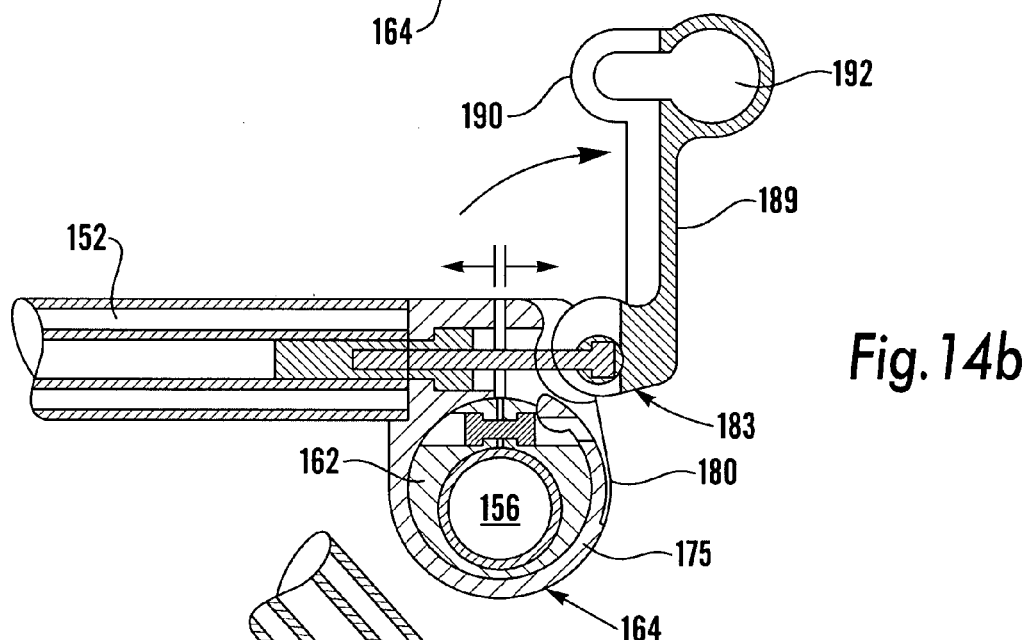
Figure 14C:
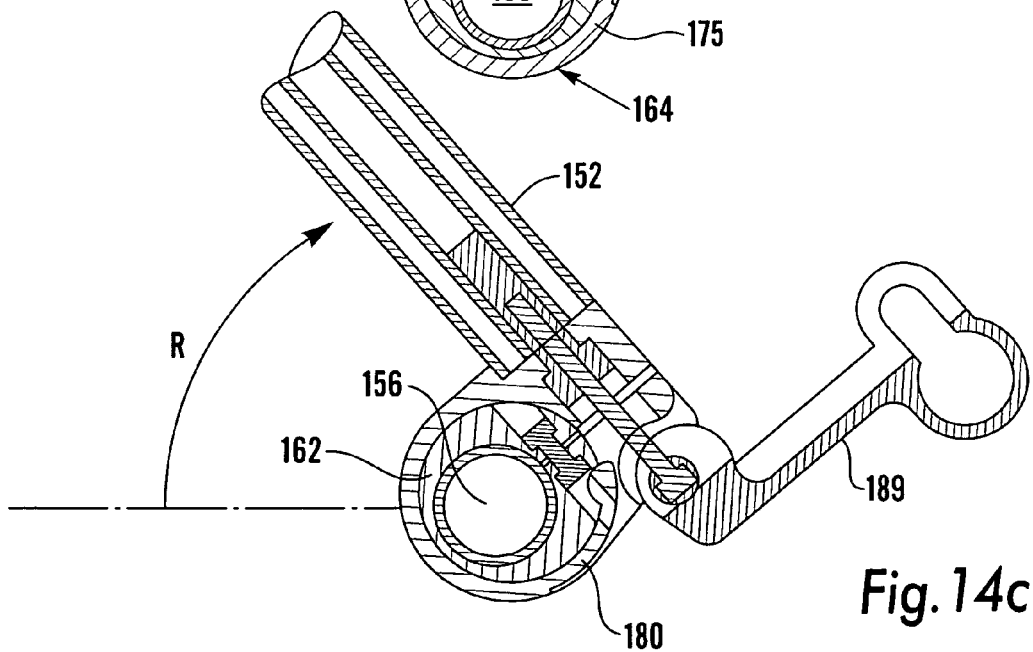

FIGS. 14a, 14b and 14c show in cross section three stages in moving a modified rotatable coupling (150'), which is similar to that of FIGS. 12 and 13 (features in common to both arrangements share the same reference number). The lever (189) of the biasing device (183) is configured to rotate in the opposite direction to the one shown in FIGS. 12 and 13, and includes a clip (190) for clamping around the horizontal member (152). The clip (190) includes a finger hole (192) for ease of unclipping from the horizontal member (152).

Stage One: When the body (164) is clamped around the cylindrical periphery (166) of the first part (162), the biasing device (183) is applying a compressive force F across the slot (177). In this position, the profile (181) of resilient member (180) is engaged in recess (170), and held in place by the lever operated cam drive (184). In this configuration, the horizontal member (152) cannot rotate relative to the vertical member (156).

Stage Two: When the lever (189) is rotated relative to the body (175), the compressive force across the slot (177) is removed and the body (175) becomes a relatively loose fit around the cylindrical periphery (166) of the first part (162). (The body (175) remains confined within the radial flanges (168) on the first part (162)).

Stage Three: In the absence of compressive force F and interference with the lever (189), profile (181) is easily dislodged from recess (170), enabling the horizontal member (152) to rotate in direction R relative to the vertical member (156). The original alignment between the horizontal and vertical members (152 and 156) can be reliably restored by rotating the second part (164) relative to the first part (162) until the profile (181) finds recess (170) and clicks therein.

Wheel

Figure 15B:
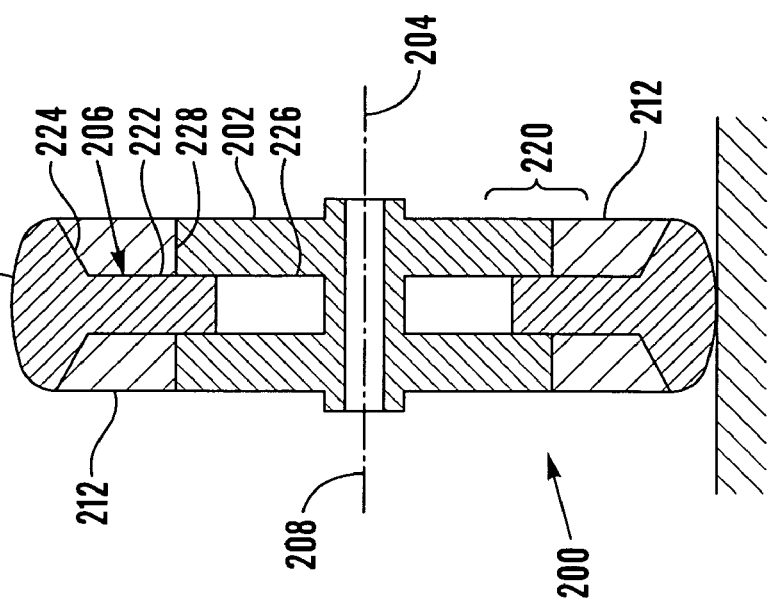
FIGS. 15a and 15b show front and sectional views respectively of a wheel according to yet another aspect of the present invention.
Figure 15A:
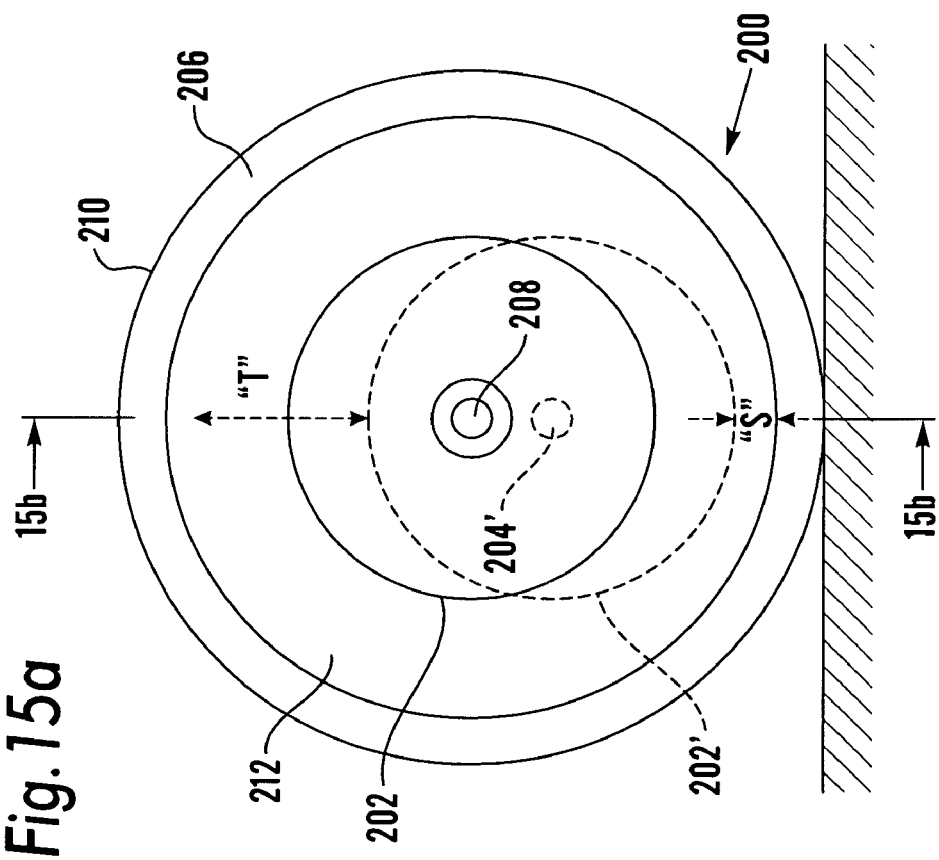

FIGS. 15a and 15b show a wheel (200) for use in the castor assembly (30). The wheel (200) comprises a hub (202) having an axis of rotation (204) and an annular member (206) having a central axis (208) initially coaxial with the rotation axis (204). The annular member (206) has a rigid radially outermost periphery (210) for ground engagement. A resilient suspension (212) e.g. of soft rubber is disposed between the hub (202) and the annular member (206). The resilient suspension (212) enable the hub (202) to move (but not rotate) relative to the annular member (206), such that the rotation and central axes are no longer coaxial (see "displaced" hub (202') with displaced rotation axis (204') shown in phantom in FIG. 15a). The movement of the hub (202) relative to the annular member (206) causes the resilient suspension (212) to stretch "S" on one side of the axis (208) and compress "C" on the opposite side.

As shown in FIG. 15b, the wheel (200) includes a guide arrangement (220) for maintaining the central axis (208) parallel to the rotation axis (204). The guide arrangement (220) includes a raised flange profile (222) on the inner periphery (224) of the annular member (206) which projects towards the hub (202), and a corresponding groove (226) on the outer periphery (228) of hub (202). The flange profile (222) is configured to be a snug sliding fit in the groove (226). When the rotation and central axes (204,208) are coaxial, the flange profile (222) is partially received on groove (226), allowing for sliding movement therebetween in opposite radial directions without the former escaping from the latter.

Backrest

FIGS. 16a, 16b and 16c show schematically details of a support surface (300) of the backrest (130) of the seat member (14). The support surface (300) comprises a plurality of slats (306) arrange side by side, with each adjacent pair of slats (306) hinged together by a hinge coupling (308) allowing pivotal movement of one slat relative to the other around a respective pivot axis (310). The hinge coupling (308) comprises a pair of hinge supports (312), each mounted on one slat (306) and projecting towards the other of its respective pair of slats. A bolt (314) extends through each pair of hinge supports (312), coaxially with the pivot axis (310). By tightening the bolt (314), the hinge supports (312) are clamped together, locking the orientation of one slat (306) relative to the other.

The support surface (300) is mounted to a backrest (130) in two spaced-apart locations by bars (322). The operative length of the bars (322) may be adjusted to alter the spacing of the support surface from the backrest (130). The support surface (300) may be configured to provide a desired profile (e.g. corresponding to an invalid's spinal curvature) by careful selection of the relative orientation of each pair of slats. Once selected, the slat orientations are locked to maintain the desired profile.

Braking Device

The wheelchair shown in FIGS. 10 and 11 includes a cantilevered, resilient member (400) mounted on and extending from each side element (18) of chassis (12), over a respective rear wheel (26). As shown, the resilient member (400) is in its rest position, clear of interfering with rear wheel (26). Nevertheless, the resilient member (400) may be manually operated and biased towards and against the rear wheel (26) to prevent the latter from rotating. In this way, in the operative position, the resilient member (400) acts as a parking brake.

The resilient member (400) is elongate, with its free end (402) slightly flared. The free end (402) is configured to act as a guard, both to catch or intercept debris (e.g. mud) flicked up from the ground by rotation of the rear wheel (26), and to prevent the hands of an invalid sat in the wheelchair from accidentally coming into contact with the rear wheel (26). A clip (404) is provided on the resilient member (400)

for attachment to the rear wheel (26) to maintain the resilient member (400) in the operative position until it is unclipped from the rear wheel (26).

Chair

Figure 17A:
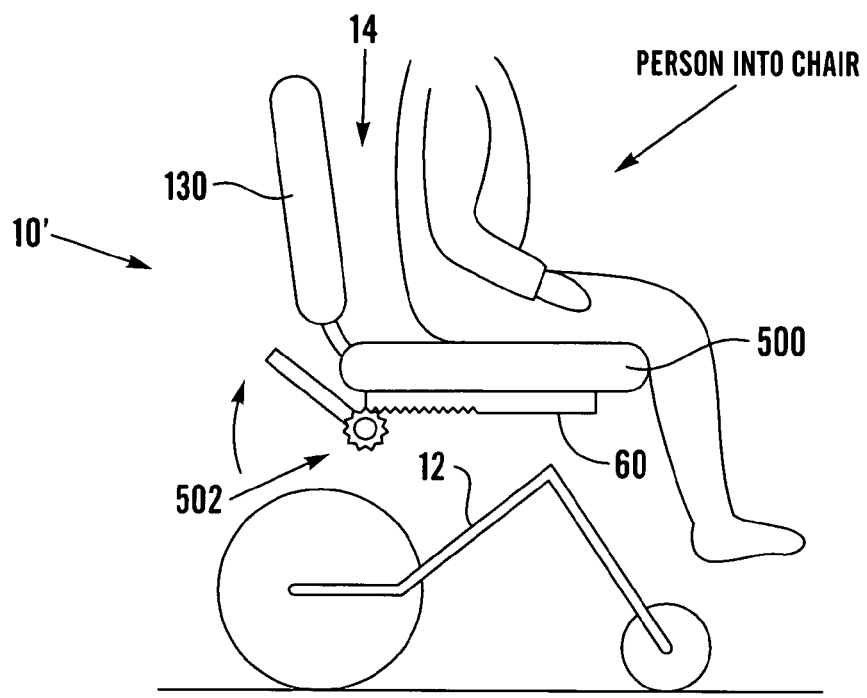
FIGS. 17a and 17b show schematic side views of a chair according to yet another aspect of the present invention.
Figure 17B:
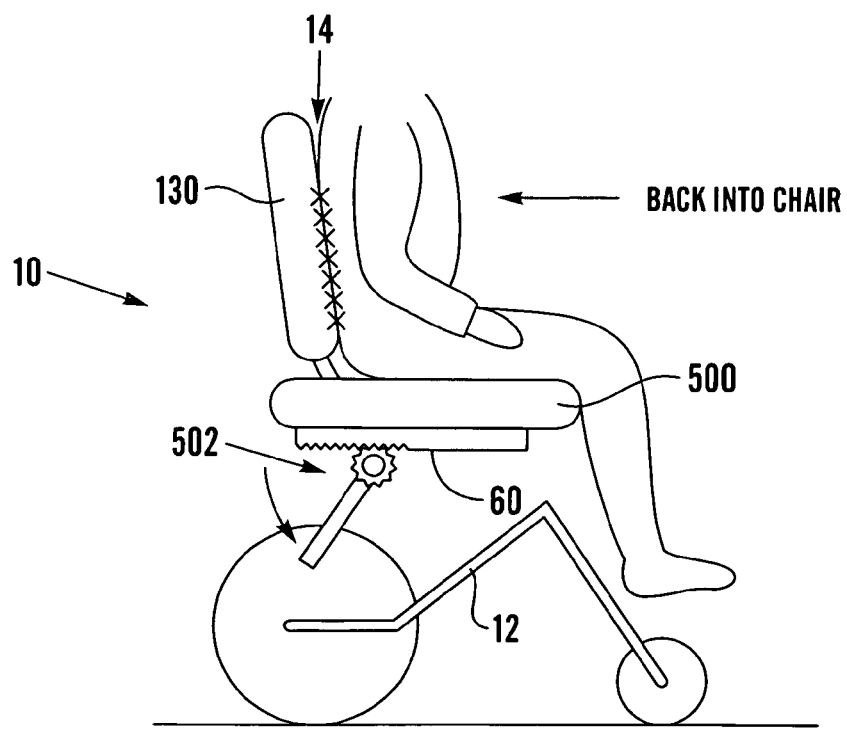

FIGS. 17a and 17b illustrate schematically the wheelchair (10') to show a feature of seat member (14). A horizontal platform (500) covered by a cushion on which an invalid sits, is slidably mounted on the plates (60) for movement relative to the backrest (130). The platform (500) is moveable from a first (forward) position (FIG. 17a) where an invalid is first seated on the seat member (14), towards the backrest (130) to a second position (FIG. 17b), where the invalid's back is urged against the backrest (130). A lever operative rack and pinion arrangement (502) is provided to control movement of the platform (500). The lever operated arrangement (502) is located for operation by a wheelchair attendant stood behind backrest (130).

Figure 18A:
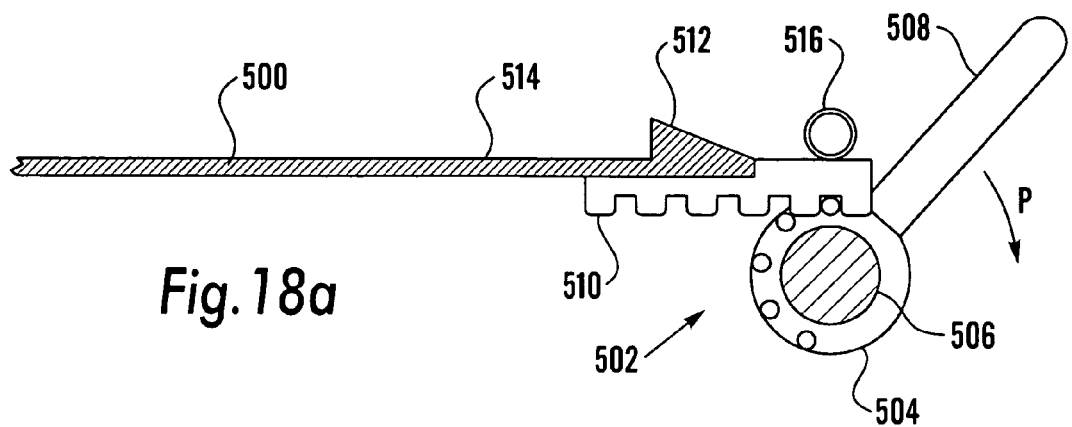
FIGS. 18a, 18b and 18c show different stages of use of details of the chair of FIGS. 17a and 17b.
Figure 18B:
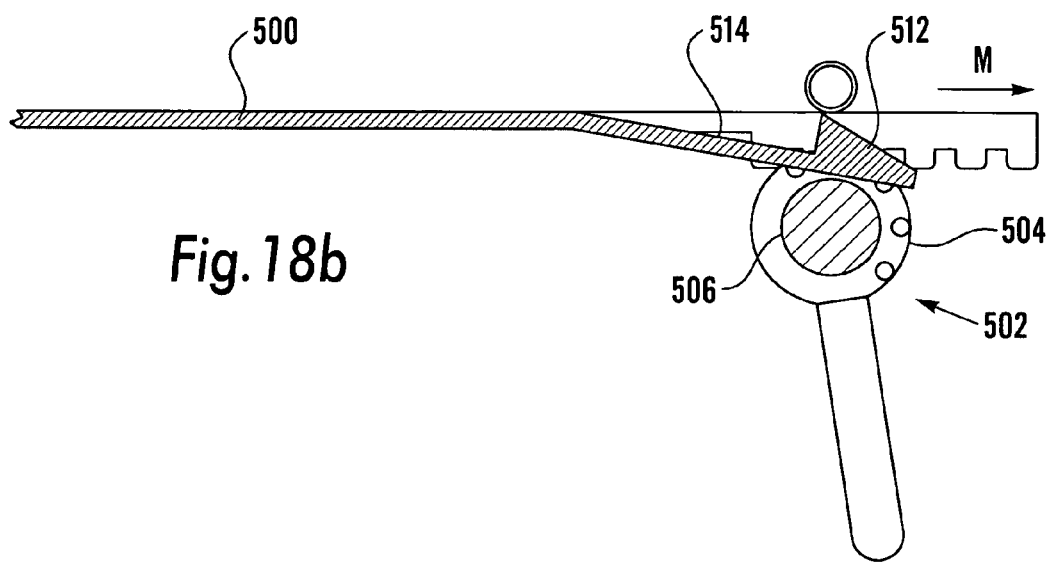
Figure 18C:
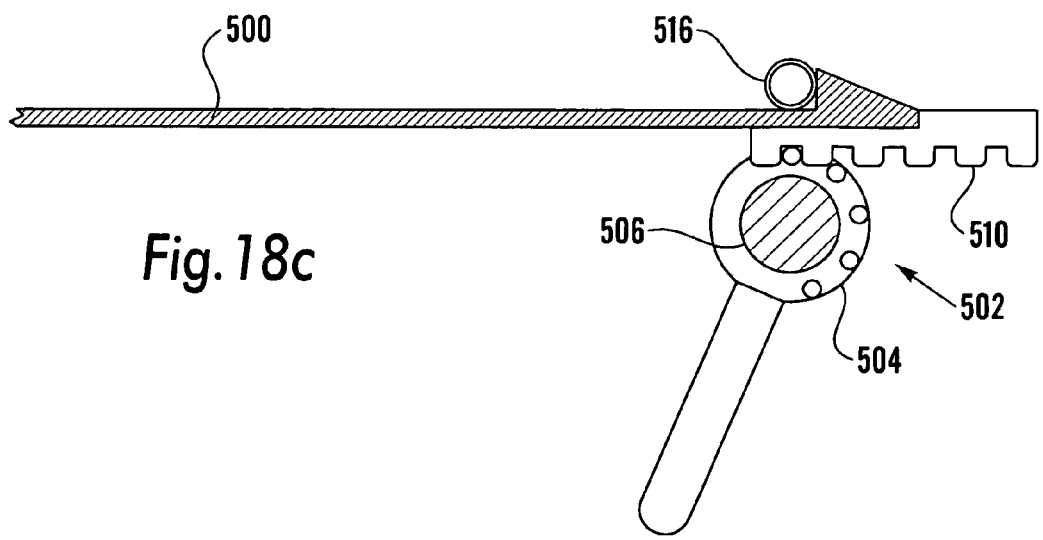

FIGS. 18a, 18b and 18c show the rack and pinion arrangement (502) in more detail. With the platform (500) in the forward position, pinion (504) is rotated around shaft (506) —which in practice forms part of rearward position (66) of seat (14) in FIG. 4—by moving lever (508) in direction of arrow "P". As the pinion (504) rotates, it meshes with rack (510), pulling platform (500) in direction of arrow "M". The platform (500) includes a lock (512) mounted on resilient strip (514) which flexes under stop (516) as the platform moves in direction of arrow "L". When the platform is in the second position, the lock (512) is trapped behind the stop (516) by the resilient bias of strip (514). The platform (500) thus remains in the second position until the lock (512) is released from behind stop (516) and the lever (508) is moved in a direction opposite to that shown by arrow "P".

What is claimed is:

1. A wheelchair comprising:
    a chassis comprising a support beam, a pair of spaced-apart side elements, each depending from the support beam and having a first part for supporting a front ground-engaging wheel and a second part for supporting a rear ground-engaging wheel; and
    a bracing member extending between the side elements 10 and spaced from the support beam;
    a seat member rotatably mounted on the support beam to allow rotational movement of the seat member around the support beam; and
    variable length strut coupled to the bracing member and supporting the seat member, with variation in length of the variable length strut altering a seat inclination relative to the chassis;
    wherein the second part of at least one side element comprises a forked arrangement with tines extending away from its respective first part, the forked arrangement being configured to engage opposite ends of a rear wheel axle of its respective rear ground-engaging wheel, with one tine being configured to mount an anti-tip bar for preventing catastrophic backward tipping of the wheelchair.

2. A wheelchair according to claim 1, in which the variable length strut includes a shock absorber.

3. A wheelchair according to claim 1, further comprising an anti-tip bar mounted on one tine of the forked arrangement, the anti-tip bar being movable from a first (operative) position for preventing catastrophic backward tipping of the chassis to a second (inoperative) position where backward tipping of the chassis is unhindered.

4. A wheelchair according to claim 3, in which the anti-tipping bar is biased to remain in whichever of the first and second positions it is placed.

5. A wheelchair according to claim 1, further comprising a brake for one rear ground-engaging wheel, the brake being mounted on the forked arrangement of one side element and having a braking element movable between a first position where it is urged against its ground-engaging wheel and a second position spaced from its ground-engaging wheel.

6. A wheelchair according to claim 5, in which the braking element is biased to remain in whichever of the first and second position it is placed.

7. A wheelchair according to claim 6, in which the braking element is mounted on a lever, with the lever being pivotally mounted to one side element with an over-centre locking mechanism biased by resilience between the rear ground-engaging wheel and the braking element.

8. A wheelchair according to claim 1, further comprising a leg rest assembly pivotally coupled to the seat member, the leg rest assembly being releasably held at a predetermined inclination relative to the seat member by a support arm extending from the chassis.

9. A wheelchair according to claim 8, in which the support arm is pivotally coupled to the support beam.

10. A wheelchair according to claim 8, in which the predetermined inclination is variable and determined by varying positional engagement between the leg rest assembly and support arm relative to pivotal coupling of the leg rest assembly to the seat member.

11. A wheelchair according to claim 1, in which the first and second parts of each side element are disposed on opposite lateral sides of the support beam, extending respectively in front of and behind the support beam.

12. A wheelchair according to claim 1, in which each side element is configured to be used interchangeably on either side of the support beam.

13. A wheelchair according to claim 1, in which the bracing member extends between the second parts of the side elements.

14. A wheelchair according to claim 1, in which the seat member is rotatably coupled to the support beam by at least one bracket member disposed between the side elements.

15. A wheelchair according to claim 1, further comprising a back rest detachably coupled to the rearward portion of the seat member.

16. A wheelchair according to claim 15, in which the back rest is detachably coupled to the rearward portion of the seat member by a coupling which is adjustable to vary back rest inclination relative to the seat member.

17. A wheelchair according to claim 1, in which the forked arrangement comprises a pair of tines each of sheet material.

18. A wheelchair according to claim 17, in which at least one tine has an elongate aperture extending through its sheet material from face to face.

* * * * *